United States Patent
Cosby et al.

(10) Patent No.: US 6,933,334 B2
(45) Date of Patent: Aug. 23, 2005

(54) SILICONE-CORK ABLATIVE MATERIAL

(75) Inventors: Steven A. Cosby, Rogersville, AL (US); Matthew Kelly, Huntsville, AL (US); Beth Van Waveren, Huntsville, AL (US)

(73) Assignee: United Technologies Corporation, Hartford, CT (US)

( * ) Notice: Subject to any disclaimer, the term of this patent is extended or adjusted under 35 U.S.C. 154(b) by 100 days.

(21) Appl. No.: 10/607,278

(22) Filed: Jun. 25, 2003

(65) Prior Publication Data

US 2005/0096414 A1 May 5, 2005

(51) Int. Cl.⁷ .................................................. C08J 9/32
(52) U.S. Cl. .......................... 524/16; 521/154; 521/50; 523/179; 428/447; 524/588
(58) Field of Search .................... 521/154, 50; 523/179; 524/16, 588; 428/447; 260/988.12

(56) References Cited

U.S. PATENT DOCUMENTS

| 4,031,059 A | * | 6/1977 | Strauss ........................ 523/179 |
| 4,837,250 A | | 6/1989 | Headrick et al. |
| 5,307,992 A | | 5/1994 | Hall et al. |
| 6,627,697 B2 | * | 9/2003 | Barney et al. .............. 524/588 |

* cited by examiner

*Primary Examiner*—David J. Buttner
*Assistant Examiner*—Christopher Keehan
(74) *Attorney, Agent, or Firm*—Bachman & LaPointe, P.C.

(57) ABSTRACT

In accordance with the present invention, a material for use in a thermal protection system contains a silicone resin binder, a silicone catalyst, ground cork, glass ecospheres, and a silicone solvent. In a preferred embodiment, the material consists of from 65.3 wt % to 72.3 wt % silicone resin, from 6.5 wt % to 7.25 wt % silicone catalyst, from 7.22 wt % to 7.98 wt % ground cork, from 8.36 wt % to 9.24 wt % glass ecospheres, and the balance silicone solvent.

20 Claims, No Drawings

SILICONE-CORK ABLATIVE MATERIAL

BACKGROUND OF THE INVENTION

The present invention pertains to a synthetic coating composition, and more particularly to a silicone-cork ablative material.

Ablative materials are used as heat shields to protect space vehicles as they are subjected to high velocity, high temperature conditions during launch and during re-entry to the earth's atmosphere. Such materials need to exhibit good adhesion to the substrate, be flexible enough to provide thermal strain stability, have good thermal stability, and have low thermal conductivity.

Ablative materials in current use may be roughly categorized as either solid materials or cured-in-place coating compositions. Cured-in-place ablative coating compositions may be either low viscosity compositions for a spray application or high viscosity compositions for hand trowel application.

Solid coverings (e.g. cork sheet or ceramic blocks) must be conformed and adhered to the substrate to be protected. Fabrication of a smooth covering from solid ablative materials and removal of the charred covering from the spacecraft after re-entry are difficult, time consuming, and expensive processes.

U.S. Pat. No. 4,837,250 to Headrick et al. illustrates a trowelable ablative coating composition. The composition comprises an epoxy resin, an amide curing agent, glass microspheres, and ground cork.

One problem which exists today is the weight of current thermal protection systems. The materials required to protect a vehicle are relatively heavy, and the more a material weighs, the less payload or weight can be launched or carried. Materials require the capability to protect the applicable surface by virtue of their properties. Most current thermal protection systems are limited to the ablation of the material, and the quantity applied to protect the substrate of the vehicle. This results in the undesirable weight. Furthermore, thicker materials for higher temperature areas add additional weight and further reduce payload capacity.

SUMMARY OF THE INVENTION

Accordingly, it is an object of the present invention to provide a thermal protection system material that meets the thermal requirements for aerospace launch vehicles and carriers.

It is a further object of the present invention to provide a thermal protection system material as above which can be sprayed and can be built up to any required thickness for proper thermal protection.

The foregoing objects are attained by the thermal protection system material of the present invention.

In accordance with the present invention, a material for use in a thermal protection system contains a silicone resin binder, a silicone catalyst, ground cork, hollow glass microspheres, sold under the trademark Eccospheres™, and a silicone solvent.

Other details of the silicone-cork ablative material of the present invention, as well as other objects and advantages attendant thereto, are set forth in the following detailed description.

DETAILED DESCRIPTION OF THE PREFERRED EMBODIMENT

In accordance with the present invention, a silicone-cork ablative material is provided which meets the thermal requirements for aerospace launch vehicles and carriers. The silicone-cork ablative material of the present invention may be applied to any surface to be exposed to a high temperature environment and which requires thermal protection.

A silicone-cork ablative material in accordance with the present invention broadly contains a silicone resin binder, preferably a high temperature silicone resin binder such as Dow Corning Sylgard 184 resin, a silicone catalyst, such as Down Corning Sylgard 184 curing catalyst, a ground cork for providing ablative properties, glass Eccospheres™ for providing high temperature capabilities such as Emerson Cumming IG-201 or SI glass Eccospheres™ and a silicone solvent such as Dow Corning OS-10.

In a preferred embodiment of the present invention, the silicone-cork ablative materials consists of from 65.3 wt % to 72.3 wt % silicone resin, from 6.5 wt % to 7.25 wt % silicone catalyst, from 7.22 wt % to 7.98 wt % ground cork, from 8.36 wt % to 9.24 wt % glass ecospheres, and the balance silicone solvent, most preferably from 7.6 wt % to 8.40 wt % silicone solvent.

The silicone cork ablative material may be applied using the CST™ spray system such as that shown in U.S. Pat. No. 5,307,992, which is incorporated by reference herein. The CST™ spray system can be best understood in terms of its two main component delivery systems, i.e. the liquid (resin and catalyst) delivery system and the solids (cork and glass) delivery system. In the case of Silicone-Cork ablative, the liquid portion is a high temperature silicone encapsulate that is comprised of two part resin/catalyst. The resin and catalyst are delivered from their pressure pots to the spray gun using metering pumps. The metering pumps, with their associated controls, allow the accurate flow of resin and catalyst to produce the desired Silicone-Cork density. The solids delivery system is comprised of loss-in-weight type feeder systems that control the cork and glass ecosphere flow rates. Both of these solids are delivered to the spray gun using an eductor-based pneumatic delivery system. The cork and glass Eccospheres™ are premixed in the cyclonic mixer prior to delivery to the spray gun.

One of the advantages to the present invention is that the silicone-cork ablative material may be applied to a surface to be protected using a spray process such as a convergent spray technology process using the nozzle shown in U.S. Pat. No. 6,322,000, which is also hereby incorporated by reference. In the case of silicone cork ablative application, a robot and turn table are used to achieve the desired Silicone Cork ablative thickness, overlap pattern, and the gun stand-off distances for each type structure. These basic components of the CST™ spray system would remain the same for almost any CST™ application, although the performance requirements of the system can be greatly simplified depending upon the geometry of the part to be sprayed, and the required accuracy of the sprayed coating properties (e.g. density, thickness, strength). The ability to spray the silicone-cork ablative material of the present invention allows for high build-up materials with reduced solvents and tailored application to complex surfaces.

Another advantage of the silicone-cork ablative material of the present invention is that it is capable of meeting extreme temperature conditions (i.e. −32 degrees Centigrade to +260 degrees Centigrade) that can not be met by standard materials. The silicone-cork ablative material of the present invention also acts as an insulator for the protection of equipment. Its ablative properties allow the transfer of heat through the erosion of materials during launch and flight. Still further, the silicone-cork ablative material of the present invention has a desirable density in the range of 32–42 pounds per cubic foot.

The following thermal and material tests have been performed on silicone-cork ablative material formed in accordance with the present invention.

| Test | Method |
|---|---|
| Density | AST Test Method 01 |
| Tensile Strength | ASTM D638 |
| Elongation | ASTM D638 |
| Flatwise Tensile | ASTM D3165 |
| Lap Shear | ASTM C297 |
| Equal Biaxial Strain State | Axel Products Test Procedure |
| Heat Capacity, Cp | Differential Scanning Calorimetry |
| Thermal Conductivity | ASTM C177 |
| Ablation | Internal Test Procedure |

| Test | Value |
|---|---|
| Density, lb./cu.ft. | 32 + −2 |
| Tensile Strength, psi | 133 @ −50° F. |
|  | 121 @ 70° F. |
|  | 138 @ 300° F. |
| Elongation, % | 17.6 @ −50° F. |
|  | 14.5 @ 70° F. |
|  | 13 @ 300° F. |
| Flatwise Tensile, psi | 179 @ −50° F. |
|  | 124 @ 70° F. |
|  | 72 @ 300° F. |
| Lap Shear, psi | 161 @ −50° F. |
|  | 79 @ 70° F. |
|  | 75 @ 300° F. |
| Thermal Conductivity, Btu/hr ft ° F. | 0.059 @ −50° F. |
|  | 0.064 @ 70° F. |
|  | 0.067 @ 150° F. |
|  | 0.070 @ 300° F. |
|  | 0.075 @ 300° F. |

While the silicone-cork ablative material has particular utility on high temperature surfaces of spacecraft, aircraft, rocket boosters, and rocket engines, it may be applied on any surface which need to be protected from exposure to high temperatures.

It is apparent that there has been provided in accordance with the present invention a silicone-cork ablative material which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations that fall within the broad scope of the appended claims.

What is claimed is:

1. A material for providing thermal protection to a surface, said material containing a silicone resin, a silicone catalyst, ground cork, hollow glass microspheres, and a silicone solvent and said silicone resin being present in an amount from 65.3 wt % to 72.3 wt %.

2. A material for providing thermal protection to a surface, said material containing a silicone resin, a silicone catalyst, ground cork, hollow glass microspheres, and a silicone solvent and said catalyst being present in an amount 6.5 wt % to 7.25 wt %.

3. A material for providing thermal protection to a surface, said material containing a silicone resin, a silicone catalyst, ground cork, hollow glass microspheres, and a silicone solvent and said ground cork being present in an amount from 7.22 wt % to 7.98 wt %.

4. A material for providing thermal protection to a surface, said material containing a silicone resin, a silicone catalyst, ground cork, hollow glass microspheres, and a silicone solvent and said glass ecospheres being present in an amount from 8.36 wt % to 9.24 wt %.

5. A material for providing thermal protection to a surface, said material containing a silicone resin, a silicone catalyst, ground cork, hollow glass microspheres, and a silicone solvent and said silicone catalyst being present in an amount from 7.6 wt % to 8.4 wt %.

6. A silicone-cork ablative material consisting of from 65.3 wt % to 72.3 wt % silicone resin, from 6.5 wt % to 7.25 wt % silicone catalyst, from 7.22 wt % to 7.98 wt % ground cork, from 8.36 wt % to 9.24 wt % hollow glass microspheres, and the balance silicone solvent.

7. A silicone-cork ablative material according to claim 6, wherein said silicone solvent is present in an amount from 7.6 wt % to 8.40 wt %.

8. A surface to be subjected to a high temperature environment, which surface has a sprayed coating containing a silicone resin, a silicone catalyst, ground cork, hollow glass microspheres, and a silicone solvent, and said silicone resin being present in an amount from 65.3 wt % to 72.3 wt %.

9. A surface to be subjected to a high temperature environment, which surface has a sprayed coating containing a silicone resin, a silicone catalyst, ground cork, hollow glass microspheres, and a silicone solvent, and said silicone catalyst being present in an amount from 6.5 wt % to 7.25 wt %.

10. A surface to be subjected to a high temperature environment, which surface has a sprayed coating containing a silicone resin, a silicone catalyst, ground cork, hollow glass microspheres, and a silicone solvent, and said ground cork being present in an amount from 7.22 wt % to 7.98 wt %.

11. A surface to be subjected to a high temperature environment, which surface has a sprayed coating containing a silicone resin, a silicone catalyst, ground cork, hollow glass microspheres, and a silicone solvent, and said glass ecospheres being present in an amount from 8.36 wt % to 9.24 wt %.

12. A surface to be subjected to a high temperature environment, which surface has a sprayed coating containing a silicone resin, a silicone catalyst, ground cork, hollow glass microspheres, and a silicone solvent, and said silicone solvent being present in an amount from 7.6 wt % to 8.4 wt %.

13. A surface to be subjected to a high temperature environment, which surface has a sprayed coating and said coating consisting of from 65.3 wt % to 72.3 wt % silicone resin, from 6.5 wt % to 7.25 wt % silicone catalyst, from 7.22 wt % to 7.98 wt % ground cork, from 8.36 wt % to 9.24 wt % hollow glass microspheres, and the balance silicone solvent.

14. A surface according to claim 13, wherein said silicone solvent is present in an amount from 7.6 wt % to 8.4 wt %.

15. A surface according to claim 8, wherein said surface is an airframe surface.

16. A surface according to claim 9, wherein said surface is an airframe surface.

17. A surface according to claim 10, wherein said surface is an airframe surface.

18. A surface according to claim 11, wherein said surface is an airframe surface.

19. A surface according to claim 12, wherein said surface is an airframe surface.

20. A surface according to claim 13, wherein said surface is an airframe surface.

* * * * *